(12) United States Patent
Xenakis et al.

(10) Patent No.: US 12,035,170 B2
(45) Date of Patent: Jul. 9, 2024

(54) MANAGING CONGESTION IN A SATELLITE COMMUNICATIONS NETWORK

(71) Applicant: Iridium Satellite LLC, McLean, VA (US)

(72) Inventors: George Xenakis, Tempe, AZ (US); Jayesh Patel, Gilbert, AZ (US); Hermon Pon, McKinney, TX (US)

(73) Assignee: IRIDIUM SATELLITE LLC, McLean, VA (US)

( * ) Notice: Subject to any disclaimer, the term of this patent is extended or adjusted under 35 U.S.C. 154(b) by 238 days.

(21) Appl. No.: 16/715,230

(22) Filed: Dec. 16, 2019

(65) Prior Publication Data

US 2020/0196188 A1 Jun. 18, 2020

Related U.S. Application Data

(63) Continuation of application No. 15/698,011, filed on Sep. 7, 2017, now Pat. No. 10,524,159.

(51) Int. Cl.
*H04W 28/02* (2009.01)
*H04B 7/185* (2006.01)
*H04W 28/20* (2009.01)

(52) U.S. Cl.
CPC .... *H04W 28/0289* (2013.01); *H04B 7/18521* (2013.01); *H04W 28/0205* (2013.01); *H04W 28/0247* (2013.01); *H04W 28/20* (2013.01)

(58) Field of Classification Search
CPC ......... H04W 28/0289; H04W 28/0205; H04W 28/0247; H04B 7/18521
See application file for complete search history.

(56) References Cited

U.S. PATENT DOCUMENTS

| | | | | |
|---|---|---|---|---|
| 5,920,804 A * | 7/1999 | Armbruster | ........ | H04B 7/18584 455/430 |
| 6,185,409 B1 * | 2/2001 | Threadgill | ......... | H04B 7/18539 455/12.1 |
| 6,198,907 B1 * | 3/2001 | Torkington | ............ | H04B 7/195 455/12.1 |
| 6,317,584 B1 | 11/2001 | Abu-Amara et al. | | |
| 6,343,205 B1 * | 1/2002 | Threadgill | ......... | H04B 7/18578 455/12.1 |

(Continued)

*Primary Examiner* — Won Tae C Kim
(74) *Attorney, Agent, or Firm* — Baker Botts L.L.P.

(57) ABSTRACT

In one implementation, congestion in a satellite communications network is managed based on current resource usage information received for a primary satellite servicing a terminal that is requesting to initiate a communications session. The current resource usage information is received within a communications session setup procedure that identifies a type of the communications session being requested by the terminal. Resources for serving the communications session are determined based on the type of the communications session being requested by the terminal. Thereafter, a determination is made as to whether sufficient resources are available at the primary satellite for servicing the communications session. In response to determining that sufficient resources are not available at the primary satellite for servicing the communications session, a congestion mitigation strategy is determined for servicing the communications session and sent to the primary satellite for implementation.

20 Claims, 2 Drawing Sheets

(56) References Cited

U.S. PATENT DOCUMENTS

| | | | | |
|---|---|---|---|---|
| 6,711,129 B1* | 3/2004 | Bauer | H04L 47/822 | |
| | | | 370/235 | |
| 6,738,350 B1* | 5/2004 | Gao | H04B 7/18584 | |
| | | | 455/452.2 | |
| 6,738,363 B1* | 5/2004 | Best | H04W 72/56 | |
| | | | 370/347 | |
| 6,904,265 B1* | 6/2005 | Valdivia | H04B 7/18539 | |
| | | | 455/12.1 | |
| 7,940,713 B2 | 5/2011 | Jin | H04L 69/161 | |
| | | | 370/428 | |
| 8,068,827 B2* | 11/2011 | Miller | H04B 7/195 | |
| | | | 455/12.1 | |
| 8,712,321 B1* | 4/2014 | Dankberg | H04B 7/2041 | |
| | | | 455/12.1 | |
| 9,055,405 B2* | 6/2015 | Ling | H04N 21/64322 | |
| 9,198,077 B2 | 11/2015 | Park | | |
| 9,246,775 B2* | 1/2016 | Esserman | H04L 41/5025 | |
| 9,680,559 B1* | 6/2017 | Freedman | H04B 7/0617 | |
| 9,699,088 B2* | 7/2017 | Roy | H04W 8/04 | |
| 9,736,844 B2* | 8/2017 | Tayrac | H04B 7/18539 | |
| 9,749,035 B2* | 8/2017 | Vasavada | H04B 7/195 | |
| 9,750,079 B1* | 8/2017 | Mitchell | H04B 7/18508 | |
| 9,763,167 B2* | 9/2017 | Gopal | H04B 7/1851 | |
| 10,110,300 B2* | 10/2018 | Xu | H04L 41/0896 | |
| 10,367,677 B2* | 7/2019 | Parkvall | H04W 52/0245 | |
| 2002/0003776 A1* | 1/2002 | Gokhale | H04Q 11/0478 | |
| | | | 370/467 | |
| 2002/0147992 A1* | 10/2002 | King | H04N 21/42661 | |
| | | | 725/151 | |
| 2002/0174136 A1* | 11/2002 | Cameron | G06F 16/284 | |
| 2005/0143003 A1* | 6/2005 | Lee | H04B 7/18532 | |
| | | | 455/430 | |
| 2006/0143444 A1* | 6/2006 | Malkamaki | H04W 28/06 | |
| | | | 713/160 | |
| 2007/0014289 A1* | 1/2007 | Settle | H04L 12/1881 | |
| | | | 370/450 | |
| 2008/0092181 A1* | 4/2008 | Britt | H04N 21/482 | |
| | | | 348/E7.071 | |
| 2010/0118765 A1* | 5/2010 | Agarwal | H04B 7/18539 | |
| | | | 370/316 | |
| 2010/0120359 A1* | 5/2010 | Agarwal | H04B 7/18539 | |
| | | | 455/12.1 | |
| 2011/0019626 A1* | 1/2011 | Karaoguz | H04L 41/14 | |
| | | | 370/329 | |
| 2011/0075655 A1* | 3/2011 | Sahin | H04L 65/1104 | |
| | | | 370/352 | |
| 2012/0190353 A1* | 7/2012 | Harwell | H04W 4/02 | |
| | | | 455/422.1 | |
| 2012/0197552 A1* | 8/2012 | Robinson | H04Q 9/00 | |
| | | | 702/50 | |
| 2013/0215746 A1 | 8/2013 | Bhooma | | |
| 2013/0244570 A1* | 9/2013 | Park | H04B 7/2041 | |
| | | | 455/12.1 | |
| 2013/0301521 A1* | 11/2013 | Abdi | H04L 65/1045 | |
| | | | 370/316 | |
| 2013/0315164 A1* | 11/2013 | Arur | H04W 76/40 | |
| | | | 370/328 | |
| 2014/0162582 A1* | 6/2014 | Daly | H04W 76/50 | |
| | | | 455/404.1 | |
| 2015/0282003 A1* | 10/2015 | Noerpel | H04W 72/0486 | |
| | | | 370/236 | |
| 2016/0037434 A1* | 2/2016 | Gopal | H04B 7/1851 | |
| | | | 370/316 | |
| 2016/0072691 A1 | 3/2016 | Xu et al. | | |
| 2016/0377730 A1* | 12/2016 | Drescher | G01S 19/40 | |
| | | | 342/357.23 | |
| 2017/0012878 A1* | 1/2017 | Rahman | H04L 67/52 | |
| 2017/0195483 A1* | 7/2017 | Gault | H04M 3/42289 | |
| 2017/0245185 A1* | 8/2017 | Chuberre | H04W 28/04 | |
| 2017/0353871 A1* | 12/2017 | Tatum | H04W 16/28 | |
| 2018/0218240 A1* | 8/2018 | Kumar | G06K 9/6227 | |
| 2018/0270284 A1* | 9/2018 | Lee | H04L 45/12 | |
| 2018/0343587 A1* | 11/2018 | Condeixa | H04W 4/027 | |
| 2019/0082481 A1* | 3/2019 | Ravishankar | H04W 76/10 | |
| 2019/0103913 A1* | 4/2019 | Cooper | H04B 7/18586 | |
| 2019/0121665 A1* | 4/2019 | Clancy | G06F 9/4881 | |

* cited by examiner

MANAGING CONGESTION IN A SATELLITE COMMUNICATIONS NETWORK

RELATED APPLICATIONS

This application is a Continuation of U.S. application Ser. No. 15/698,011 filed Sep. 7, 2017, the entire content of which is incorporated herein by reference.

TECHNICAL FIELD

The disclosure relates generally to satellite communications networks and specifically to managing congestion in satellite communications networks.

SUMMARY

According to one implementation of the disclosure, congestion in a satellite communications network is managed based on current resource usage information received for a primary satellite servicing a terminal that is requesting to initiate a communications session. The current resource usage information is received within a communications session setup procedure that identifies a type of the communications session being requested by the terminal. Resources for serving the communications session are determined based on the type of the communications session being requested by the terminal. Thereafter, a determination is made as to whether sufficient resources are available at the primary satellite for servicing the communications session. In response to determining that sufficient resources are not available at the primary satellite for servicing the communications session, a congestion mitigation strategy is determined for servicing the communications session and sent to the primary satellite for implementation.

Other features of the present disclosure will be apparent in view of the following detailed description of the disclosure and the accompanying drawings. Implementations described herein, including the above-described implementation, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Figure 1:
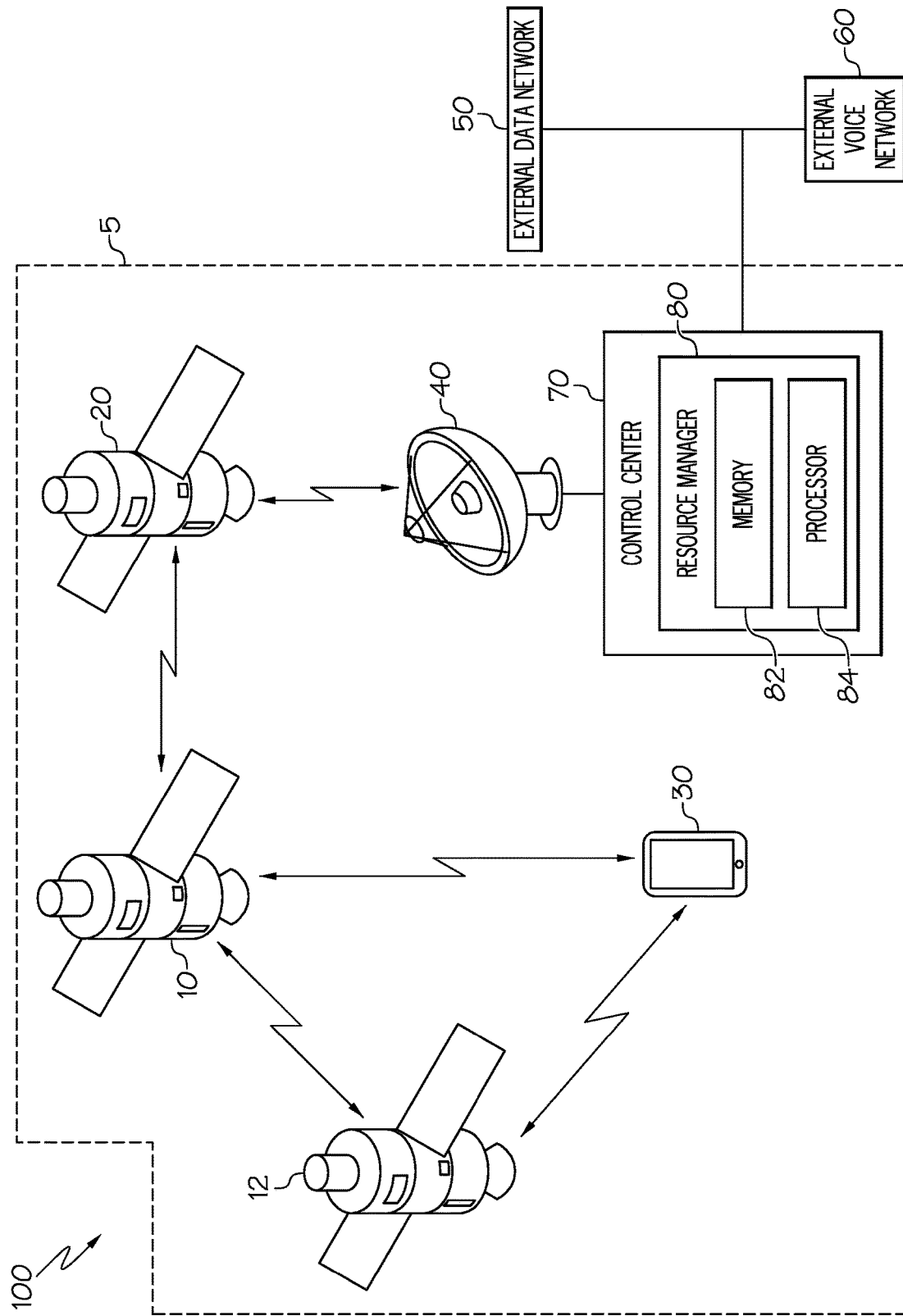
FIG. 1 is a high-level block diagram of a system for congestion management in a satellite communications network in accordance with a non-limiting implementation of the present disclosure.

A satellite communications system enables wireless voice and data communications. Hand-held satellite phones and other terminals transmit communications to and/or receive communications from one or more satellites in the satellite communications network. The satellites route communications received from or destined to terminals through the satellite communications network, for example, through inter-satellite wireless communications crosslinks, and/or to one or more interfaces to external communications networks (including, but not limited to, the Internet and/or telephone communications networks), for example, via a terrestrial base station, Earth terminal, ground gateway, or other communications network servicing station.

In some implementations, different terminals may be provisioned for different service plans within a satellite communications system. Such service plans may vary and offer different features intended to appeal to different usage needs or desires of end users. For example, some plans may offer relatively high bandwidth and premium quality of service levels, while other plans may provide relatively low bandwidth and lower quality of service levels. Additionally or alternatively, some service plans may be limited to telephony while others may be limited to data communications while still other may enable both telephony and data communications. Furthermore, different plans may enable communications according to different communications protocols.

In some implementations, individual satellites within a satellite communications network provide service coverage for defined regions. The regions for which the satellites provide service coverage may be defined by the ration patterns of the satellites' antennas and may be referred to herein as coverage footprints. In certain implementations, the coverage footprints of individual satellites may be composed of multiple different beams. For example, in one particular example, the coverage footprint of an individual footprint may be composed of 48 different beams.

By coordinating the regions to which multiple satellites provide service coverage, a satellite communications network may provide service coverage across an expansive geographic region and, in some cases, globally. In some implementations, a satellite communications network may be composed of multiple satellites in low-Earth orbit ("LEO") (e.g., having an altitude between the Earth's surface and approximately 1,200 miles) arranged in coordinated orbits to provide service coverage across large regions of the Earth. In one particular implementation, a satellite communications network may be composed of multiple LEO satellites (e.g., 66 satellites) that are connected by wireless inter-satellite communications crosslinks and that are arranged in multiple planes (e.g., 6 planes of 11 satellites each) having substantially polar orbits so as to provide substantially global service coverage. In such an implementation, as the satellites orbit, the geographic regions covered by their coverage footprints may change such that, in order to continue to handle a communications session with a particular terminal, the communications session may be handed off from one satellite to another. Additionally or alternatively, in some implementations, a communications session with a particular terminal also may be handed off between different beams of an individual satellite as the satellite orbits and the geographic regions covered by the beams of the satellite change.

As described above, in some implementations, a satellite communications network may interface with one or more additional external networks. In such implementations, a ground gateway may provide the interface between the satellite communications network and one or more additional external networks. When communications that originate within the satellite communications network and that are destined for an external network reach such a ground gateway, the ground gateway (and, in some implementations, one or more additional components such as, for example, a switch) routes the communications to appropriate destinations on the external network. Additionally or alternatively, the ground gateway may perform data transformations and other processing functions to convert communications from the satellite network into a format recognized by the destination external network. Similarly, communications that originate on an external network and that are destined for the satellite communications network may be received by the ground gateway and routed to appropriate destinations on the satellite communications network. In such cases, the ground gateway may perform data transformations and other processing functions to convert the communications from the external network into a format recognized by the satellite communications network before routing the communications to terminals in the satellite communications network.

In some cases, some geographic regions served by a satellite communications network may have a larger number of active terminals than others. Accordingly, the load on the satellites servicing those regions may be greater than the load on other satellites servicing other, less active regions. Additionally or alternatively, in implementations in which individual satellites within a satellite communications network are connected by wireless inter-satellite communications crosslinks, and communications are routed through the satellite communications network over the crosslinks, some crosslinks may be loaded more heavily than other crosslinks. In either case, in some implementations, the maximum load that an individual satellite or an individual crosslink can service may be limited causing the potential for congestion within the satellite communications network.

The teachings of the present disclosure present techniques for managing congestion in satellite communications networks. As described in greater detail below, in some implementations, such congestion management techniques may be performed by a terrestrial control center, which, for example, may be communicatively coupled to or integrated within a ground gateway. As disclosed herein, a terrestrial control center may collect information from satellite network nodes (e.g., individual satellites), such as, for example, the number of active communications session currently being serviced by a satellite, available bandwidth and/or channels for servicing additional communications sessions, available bandwidth on the satellite's crosslinks, excess capacity, and other resource usage information for the satellite. Additionally or alternatively, the terrestrial control center may also access information regarding individual terminals served by the communications network, such as, for example, previous usage, provisioned services, and/or bandwidth or service level agreements for the active terminals. The terrestrial control center then may assess current resource usage at individual satellites (including, for example, current channel usage) with respect to active and/or requested communications sessions and send congestion mitigation plans to one or more satellites in an effort to appropriately serve the active and/or requested communications sessions.

In some implementations, a satellite communications network performs a call (or communications session) setup process when a new communications session is requested by or for a terminal. Additionally or alternatively, in some implementations, a satellite communications network may perform a call setup process when an active communications session is handed off from one servicing satellite to another and/or when an active communications session is handed off from one beam of an individual satellite to another beam of the individual satellite. In such implementations, the call setup process may involve one or more communications between the terminal, the satellite through which the communications session will be served, and a terrestrial control center. The communications exchanged during such a call setup process may allow the terrestrial control center to allocate certain resources of the satellite communications network to the requested communications session and may help the terminal and serving satellite coordinate to establishing the beam for servicing the requested communications sessions, the communications channels (e.g., one or more signaling channels and/or one or more bearer channels) for servicing the requested communications session, certain timing requirements, and other administrative aspects for supporting the requested communications session.

As disclosed herein, as part of such a call setup process, the satellite through which the communications session will be served (or at least is being initiated) may communicate resource usage information to the terrestrial control center. Such resource usage information may include, for example, resource usage at both the satellite and serving beam level such as, for instance, current channel usage at both the satellite and serving beam level. This resource usage information may help the terrestrial control center assess the potential for or the current existence of any congestion on the satellite communications network, particularly within the vicinity of the serving satellite, before allocating resources for any additional communications session.

As part of the call setup process, the terrestrial control center may also access information regarding the terminal for which the communications session is being requested, such as, for example, priority, quality of service, service level agreements, billing rates, and/or service subscriptions. In this manner, the terrestrial control center may use satellite resource usage information and/or information regarding terminals requesting communications sessions to make determinations relevant to establishing individual communications sessions on a session-by-session basis for each communications session requested by an active terminal in the satellite communication network.

Based on such determinations, the terrestrial control center may send instructions, for example for establishing or denying a requested communications session, to one or more of the primary serving satellite and one or more neighboring satellites. For example, the instructions may instruct the primary serving satellite to establish the requested communications session but limit bandwidth or other service offerings available to the new communications session. Alternatively, as another example, the instructions may instruct the primary serving satellite to hand off the requested communications session to a neighboring satellite that, for example, may be less heavily loaded or congested, or to a different beam of the primary serving satellite.

With reference to FIG. 1, a system 100 for congestion management in a satellite communications network 5 is illustrated in accordance with a non-limiting implementation of the present disclosure. System 100 includes three satellites 10, 12, and 20 in a satellite communications network 5 that also includes terrestrial control center 70, communicatively coupled to satellites 10, 12, and 20 via terrestrial antenna 40, and subscriber terminal 30. As illustrated in FIG. 1, control center 70 is connected to an external data network 50 and an external voice network 60. In addition, control center 70 includes a resource manager 80. Resource manager 80 includes a processor 84 configured to execute instructions in a memory 82. As also illustrated in FIG. 1, satellites 10, 12, and 20 are equipped with crosslink antennas that enable satellites 10, 12, and 20 to establish wireless inter-satellite communications crosslinks 35.

Subscriber terminal 30 may request or initiate a communications session by acquiring a link from a serving satellite (e.g., satellite 10 or satellite 12). In certain implementations, the subscriber terminal 30 may determine the strongest satellite signal available and attempt to request or initiate a communications session with that satellite. In some implementations, this may involve determining the strongest beam of a satellite and attempting to request or initiate a communications session with the strongest beam. As illustrated in FIG. 1, the strongest signal available to subscriber terminal 30 is from primary serving satellite 10. As a consequence of subscriber terminal 30's attempt to request or initiate a communications session, a call setup process is initiated. As part of this call setup process, satellite 10 transmits communications between subscriber terminal 30 and gateway 70, for example, through satellite 20 via communications crosslinks 35. In some implementations, as part of the call setup process, subscriber terminal 30 may transmit to satellite 10 information about the particular communications session being requested by subscriber terminal 30, such as, for example, the type of service (e.g., voice or data or particular communications protocol(s)) being requested and/or an amount of bandwidth being requested to service the requested communications session. In some implementations, different classes of data communications services may be available providing different bandwidth levels. For example, in one particular implementation, there may be six different classes of data communications services available, with the first class providing approximately 20 kbps, the second class providing approximately 100 kbps, the third class providing approximately 200 kbps, the fourth class providing approximately 350 kbps, the fifth class providing approximately 700 kbps, and the sixth class providing approximately 1400 kbps. In such implementations, the subscriber terminal 30 may identify the particular class of service being requested for the communications session. Additionally or alternatively, subscriber terminal 30 may request specific bandwidth levels for both the uplink and the downlink between subscriber terminal 30 and satellite 10.

In certain implementations, as part of the call setup process, satellite 10 gathers current resource usage data, including, for example, channel usage data, that it communicates to control center 70. For example, satellite 10 may assess available capacity, bandwidth, and/or channels at satellite 10 generally, within the particular beam that satellite 10 anticipates using to service the communications session, and/or in one or more of satellite 10's crosslinks, and communicate indications of such available capacity or bandwidth to control center 70. In one example, satellite 10 may be servicing several other active communications sessions when subscriber terminal 30 requests a communications session. In response to the communications session request from subscriber terminal 30, satellite 10 may gather information regarding each of these other communications sessions currently being serviced by satellite 10. For example, satellite 10 may gather information about such communications sessions that includes the types or classes of service being provided, the amount of bandwidth allocated to the communications sessions, the number of channels currently being used by the communications sessions, and/or the amount of on-satellite resources dedicated to servicing the communications session. Additionally or alternatively, satellite 10 may also gather information regarding the current status of satellite 10's crosslinks 35 and communicate it to control center 70.

In particular implementations, current resource usage data gathered by satellite 10 is transmitted to ground gateway 70 for analysis in connection with processing the request to establish the communications session with subscriber terminal 30. In such implementations, resource manager 80 may receive or otherwise access the communications session request or information relevant thereto and the corresponding current resource usage data transmitted by satellite 10. Thereafter, processor 84 may determine a congestion mitigation strategy for servicing the requested communications session, for example, based on the corresponding current resource data, among other factors. For example, resource manager 80 may assess the channel usage data and determine that satellite 10 has sufficient resources to service the requested communications session and instruct the satellite communications network 5 to proceed with establishing the requested communications session. Alternatively, resource manager 80 may assess the channel usage data and determine that satellite 10 does not currently have sufficient available resources to service the requested communications session. In such cases, resource manager 80 may instruct the satellite communications network 5 to deny the requested communications session or resource manager 80 may devise an alternative strategy for accommodating the requested communications session.

In certain implementations, resource manager 80 makes congestion management determinations based on subscription information for the subscriber terminal 30 requesting the communications session. In such implementations, resource manager 80 may request subscription information for subscriber terminal 30 from a subscriber database. For example, a service provider that provides communications service over the satellite communications network 5 may offer multiple different subscription options that may differ, for example, with respect to available bandwidth, classes of data services, services, priority, service level agreements, and/or cost. If the bandwidth currently available at satellite 10 is limited, resource manager 80 may make a determination with respect to the request for a communications session from subscriber terminal 30 based, at least in part, on the bandwidth available to subscriber terminal 30 according to its subscription. Additionally or alternatively, in some implementations, resource manager 80 may make a determination with respect to the request for a communications session from subscriber terminal 30 based, at least in part, on any service level agreement for subscriber terminal 30 according to its subscription. It will be appreciated that these are just examples of different factors that resource manager 80 may take into account as part of making a determination with respect to the request for a communications session from subscriber terminal 30 and that, in some implementations, resource manager 80 may take a variety of additional or alternative factors into account.

In some implementations, resource manager 80 may also consider resource usage information received from numerous (or all) other satellites or nodes in the satellite communications network 5. In such implementations, this information can be transmitted to resource manager 80 on any schedule. For example, resource usage information from other satellites can be transmitted to terrestrial control center 70 periodically (e.g., once every minute) or in response to other requests to establish communications sessions through the other satellites. This resource usage information for additional satellites within satellite network 5 may enable resource manager 80 to more effectively consider and plan for congestion or other resource scarcity across the satellite communications network 5 as a whole.

Figure 2:
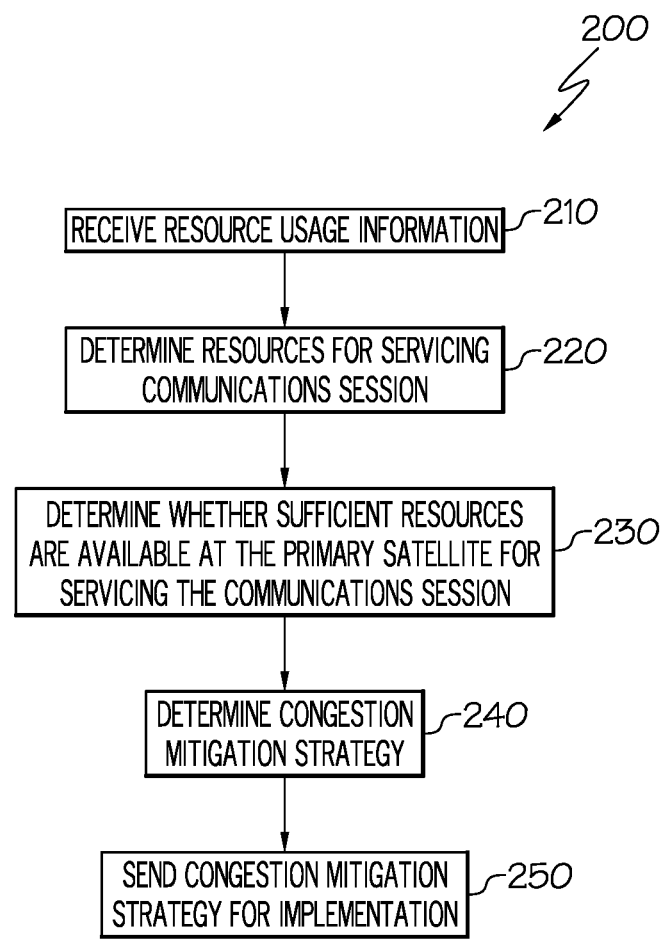
FIG. 2 is a flow chart of a method for congestion management in a satellite communications network in accordance with a non-limiting implementation of the present disclosure.

With reference to FIG. 2, a flow chart 200 of a method for congestion management in a satellite communications network is illustrated in accordance with a non-limiting implementation of the present disclosure. For example, a resource manager at a terrestrial control center in a satellite communications network, such as, for example, resource manager 80 of terrestrial control center 70 illustrated in FIG. 1, may execute the method illustrated in the flow chart 200 of FIG. 2 in response to a request for a communications session, such as a data or voice communications session, in the satellite communications network. Alternatively, in some implementations, an onboard resource management module on a satellite may execute the method illustrated in the flow chart 200.

As illustrated in FIG. 2, at step 210, resource usage information is received. Such resource usage information may reflect current attributes of the primary serving satellite for the requested communications session, such as, for example, current utilization, capacity, available bandwidth, and/or number of channels currently in use. In some implementations, resource usage information may be provided at the satellite level. In alternative implementations, resource usage information may be provided at the beam level in addition or as an alternative to the satellite level resource usage information. In some implementations, the resources usage information may be provided within a call setup process. In such implementations, information about the type of communications session being requested also may be provided within the call setup process. For example, information about the type (e.g., voice or data or specific protocol (s)) and/or class of service or bandwidth requested for the communications session may be provided within the call setup process.

At step 220, resources for servicing the requested communications session are determined. For example, the resource manager may determine a minimum acceptable level of bandwidth or service for servicing the request. This minimum level of bandwidth or service may be determined with reference to the particular type or class of service requested and/or an amount of bandwidth requested for the communications session. For example, a voice call may require a different set or amount of bandwidth and/or resources than a data communications session. As another example, the minimum level of bandwidth or service quality may be determined based upon subscription details for the requesting terminal. In some implementations, determining the resources for the requested communications session may involve determining a number of communications channels (e.g., bearer channels) between the subscriber terminal and the primary serving satellite for the communications session.

At step 230, a determination is made as to whether sufficient resources are available at the primary serving satellite for servicing the requested communications session, for example, at least in part based on the received resource usage information and/or the determined resources for the communications session. Thereafter, at step 240, a congestion mitigation strategy for servicing the requested communications session is determined. In some implementations, if it is determined at step 230 that insufficient resources for servicing the requested communications session are available at the primary serving satellite, for example, due to congestion at the primary serving satellite, a plan to reduce or otherwise accommodate the congestion may be determined. For example, existing communications sessions involving other terminals designated as being lower priority than the requested communications session may be terminated. Alternatively, the requested communications session may be denied.

As another example, a congestion mitigation strategy may involve modifying bandwidth and/or channels previously allocated to one or more other communications sessions serviced by the primary serving satellite. For example, bandwidth and/or channels previously allocated to one or more other communications sessions may be reduced so that sufficient bandwidth and/or channels are available to service the newly requested communications session. In some implementations, the existing communications sessions may require a particular level of service and/or bandwidth due to service level agreements or subscription requirements for the communicating subscriber terminals. In such cases, the required levels of service and/or bandwidth still may be honored even while bandwidth and/or channels previously allocated to one or more of the existing communications sessions are reduced. Additionally or alternatively, in some implementations, a congestion mitigation strategy may involve allocating less than the requested amount of bandwidth and/or channels to the requested communications session.

In some implementations, the current and/or projected satellite coverage area and other ephemeris for the primary serving satellite and/or one or more other satellites within the satellite communications network may be considered as part of determining a congestion mitigation strategy. For example, in such implementations, the coverage footprints of different satellites may overlap. Accordingly, multiple satellites may be available to service certain communications sessions, and a congestion mitigation strategy may involve handing off communications sessions involving other terminals designated as being lower priority to one or more other neighboring satellites. Alternatively, a congestion mitigation strategy may involve handing off the requested communications session to a neighboring satellite for servicing. As still another example of a congestion mitigation strategy, in some implementations, existing communications sessions or, alternatively, the requested communications sessions, may be handed off to a different beam of the primary serving satellite.

At step 250, the congestion mitigation strategy is transmitted for implementation by the satellite communications network. For example, the congestion mitigation strategy may be transmitted to the primary serving satellite and/or any other affected satellite in the satellite communications network for implementation. For example, if the congestion mitigation strategy involves handing off one or more communications sessions from the primary serving satellite to one or more neighboring satellites, the mitigation strategy may be sent to the primary serving satellite and each of the neighboring satellites to which communications sessions are to be handed off. The congestion mitigation strategy then may be implemented by the corresponding satellite(s), and, if appropriate, the communications sessions may be initiated in accordance with the congestion mitigation strategy.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in any claims are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method for managing a communications session in a satellite communications network, the method comprising:

executing, at a terrestrial control center for the satellite communications network, a set up process for establishing a communications session over the satellite communications network between a terminal being served by a satellite of the satellite communications network and an endpoint;

in connection with the set up process, receiving, at the terrestrial control center, from the satellite serving the terminal for which the communications session is being attempted to be established, resource usage information for the satellite that is indicative of current availability of resources at the satellite;

determining, based on the resource usage information received from the satellite, current availability of resources at the satellite for serving the terminal;

defining, based on the determined current availability of resources at the satellite for serving the terminal, and at least one characteristic associated with the terminal selected from priority, quality of service, billing rates and service subscriptions, one or more parameters for the communications session for the terminal;

transmitting, from the terrestrial control center to the satellite, the one or more parameters defined for the communications session; and establishing the communications session over the satellite communications network between the terminal and the endpoint according to the one or more parameters defined for the communications session.

2. The method of claim 1, wherein:

the satellite is configured to provide multiple beams for serving terminals;

receiving resource usage information for the satellite that is indicative of the current availability of resources at the satellite includes receiving resource usage information indicative of the current availability of resources related to a particular beam serving the terminal;

determining current availability of resources at the satellite for serving the terminal includes determining current availability of resources related to the particular beam for serving the terminal based on the received usage information indicative of the current availability of resources related to the particular beam; and defining one or more parameters for the communications session for the terminal includes defining one or more parameters for the communications session for the terminal based on the determined current availability of resources related to the particular beam for serving the terminal.

3. The method of claim 2, wherein:
determining current availability of resources related to the particular beam for serving the terminal includes determining that resources related to the particular beam are not available for serving the communications session;
defining one or more parameters for the communications session for the terminal includes identifying an alternative beam of the satellite for serving the communications session based on having determined that resources related to the particular beam are not available for serving the communications session;
transmitting the one or more parameters defined for the communications session from the terrestrial control center to the satellite includes transmitting, from the terrestrial control center to the satellite, an instruction to use the alternative beam to serve the communications session; and
establishing the communications session over the satellite communications network between the terminal and the endpoint according to the one or more parameters defined for the communications session includes establishing the communications session over the satellite communications network via the alternative beam instead of the particular beam.

4. The method of claim 1, wherein:
receiving resource usage information for the satellite that is indicative of current availability of resources at the satellite includes receiving resource usage information for the satellite that is indicative of the current availability of communications channels provided by the satellite for serving the terminal;
determining current availability of resources at the satellite for serving the terminal includes determining current availability of communications channels provided by the satellite for serving the terminal based on the received resource usage information for the satellite indicative of the current availability of communications channels provided by the satellite for serving the terminal; and
defining one or more parameters for the communications session for the terminal includes defining one or more parameters for the communications session for the terminal based on the determined availability of communications channels provided by the satellite for serving the terminal.

5. The method of claim 1, wherein:
the satellite is configured to provide multiple beams for serving terminals;
receiving resource usage information for the satellite that is indicative of current availability of resources at the satellite includes receiving resource usage information for a particular beam serving the terminal that is indicative of the current availability of communications channels provided by the particular beam for serving the terminal;
determining current availability of resources at the satellite for serving the terminal includes determining current availability of communications channels provided by the particular beam for serving the terminal based on the received resource usage information for the particular beam indicative of the current availability of communications channels provided by the particular beam for serving the terminal; and
defining one or more parameters for the communications session for the terminal includes defining one or more parameters for the communications session for the terminal based on the determined availability of communications channels provided by the particular beam for serving the terminal.

6. The method of claim 1, wherein:
executing a set up process for establishing a communications session over the satellite communications network between the terminal and endpoint includes executing a set up process for establishing a type of communications session having a defined, standard bandwidth; and
defining one or more parameters for the communications session for the terminal includes defining a bandwidth for the communications session that is less than the defined, standard bandwidth for the type of communications session.

7. The method of claim 1, wherein:
determining current availability of resources at the satellite for serving the terminal includes determining that the satellite does not currently have resources available for serving the communications session;
defining one or more parameters for the communications session for the terminal includes identifying an alternative satellite from among the multiple satellites for serving the communications session based on having determined that the satellite does not currently have resources available for serving the communications session;
transmitting the one or more parameters defined for the communications session from the terrestrial control center to the satellite includes transmitting, from the terrestrial control center to the satellite, a message for relaying to the terminal that identifies the alternative satellite as available for serving the communications session; and
establishing the communications session over the satellite communications network between the terminal and the endpoint according to the one or more parameters defined for the communications session includes establishing the communications session over the satellite communications network via the alternative satellite instead of the satellite.

8. The method of claim 1 further comprising:
deciding, based on the determined current availability of resources at the satellite for serving the terminal, to reduce bandwidth previously allocated for one or more different communications sessions involving one or more different terminals served by the satellite; and
reducing the bandwidth allocated for the one or more different communications sessions; wherein:
executing a set up process for establishing a communications session over the satellite communications network between the terminal and endpoint includes executing a set up process for establishing a type of communications session having a defined, standard bandwidth; and
defining one or more parameters for the communications session for the terminal includes defining a bandwidth for the communications session of at least the defined, standard bandwidth for the type of communications session.

9. A terrestrial control center configured to manage communications sessions in a satellite communications network, the terrestrial control center comprising:
one or more processing elements; and
non-transitory computer-readable storage media storing instructions that, when executed by the one or more processing elements, cause the one or more processing elements to:
execute a set up process for establishing a communications session over the satellite communications network between a terminal being served by a satellite of the satellite communications network and an endpoint, wherein the satellite is configured to provide multiple beams for serving terminals;
in connection with the set up process, process resource usage information received at the terrestrial control center and from the satellite serving the terminal for which the communications session is being attempted to be established that is indicative of current availability of resources at the satellite for at least one of the multiple beams;
determine, based on the resource usage information received from the satellite, current availability of resources at the satellite for serving the terminal;
define, based on the determined current availability of resources at the satellite for serving the terminal, one or more modifications to other communication sessions being served by the satellite, and one or more parameters for the communications session for the terminal;
transmit, to the satellite, the one or more modifications and the one or more parameters defined for the communications session; and
establish the communications session over the satellite communications network between the terminal and the endpoint according to the one or more parameters defined for the communications session.

10. The terrestrial control center of claim 9, wherein:
the instructions that, when executed by the one or more processing elements, cause the one or more processing elements to process the resource usage information received from the satellite that is indicative of the current availability of resources at the satellite include instructions that, when executed by the one or more processing elements, cause the one or more processing elements to process resource usage information received from the satellite that is indicative of the current availability of resources related to a particular beam serving the terminal;
the instructions that, when executed by the one or more processing elements, cause the one or more processing elements to determine current availability of resources at the satellite for serving the terminal include instructions that, when executed by the one or more processing elements, cause the one or more processing elements to determine current availability of resources related to the particular beam for serving the terminal based on the received usage information indicative of the current availability of resources related to the particular beam; and
the instructions that, when executed by the one or more processing elements, cause the one or more processing elements to define one or more parameters for the communications session for the terminal include instructions that, when executed by the one or more processing elements, cause the one or more processing elements to define one or more parameters for the communications session for the terminal based on the determined current availability of resources related to the particular beam for serving the terminal.

11. The terrestrial control center of claim 10, wherein:
the instructions that, when executed by the one or more processing elements, cause the one or more processing elements to determine current availability of resources related to the particular beam for serving the terminal include instructions that, when executed by the one or more processing elements, cause the one or more processing elements to determine that resources related to the particular beam are not available for serving the communications session;
the instructions that, when executed by the one or more processing elements, cause the one or more processing elements to define one or more parameters for the communications session for the terminal include instructions that, when executed by the one or more processing elements, cause the one or more processing elements to identify an alternative beam of the satellite for serving the communications session based on having determined that resources related to the particular beam are not available for serving the communications session;
the instructions that, when executed by the one or more processing elements, cause the one or more processing elements to transmit the one or more parameters defined for the communications session from the terrestrial control center to the satellite include instructions that, when executed by the one or more processing elements, cause the processing elements to transmit, from the terrestrial control center to the satellite, an instruction to use the alternative beam to serve the communications session; and
the instructions that, when executed by the one or more processing elements, cause the one or more processing elements to establish the communications session over the satellite communications network between the terminal and the endpoint according to the one or more parameters defined for the communications session include instructions that, when executed by the one or more processing elements, cause the one or more processing elements to establish the communications session over the satellite communications network via the alternative beam instead of the particular beam.

12. The terrestrial control center of claim 9, wherein:
the instructions that, when executed by the one or more processing elements, cause the one or more processing elements to process resource usage information received from the satellite that is indicative of current availability of resources at the satellite include instructions that, when executed by the one or more processing elements, cause the one or more processing elements to process resource usage information received from the satellite that is indicative of the current availability of communications channels provided by the satellite for serving the terminal;
the instructions that, when executed by the one or more processing elements, cause the one or more processing elements to determine current availability of resources at the satellite for serving the terminal include instructions that, when executed by the one or more processing elements, cause the one or more processing elements to determine current availability of communications channels provided by the satellite for serving the terminal based on the received resource usage information for the satellite indicative of the current availability of communications channels provided by the satellite for serving the terminal; and the instructions that, when executed by the one or more processing elements, cause the one or more processing elements to define one or more parameters for the communications session for the terminal include instructions that, when executed by the one or more processing elements, cause the one or more processing elements to define one or more parameters for the communications session for the terminal based on the determined availability of communications channels provided by the satellite for serving the terminal.

13. The terrestrial control center of claim 9, wherein:

the satellite is configured to provide multiple beams for serving terminals;

the instructions that, when executed by the one or more processing elements, cause the one or more processing elements to process resource usage information received from the satellite that is indicative of current availability of resources at the satellite include instructions that, when executed by the one or more processing elements, cause the one or more processing elements to process resource usage information received from the satellite for a particular beam serving the terminal that is indicative of the current availability of communications channels provided by the particular beam for serving the terminal;

the instructions that, when executed by the one or more processing elements, cause the one or more processing elements to determine current availability of resources at the satellite for serving the terminal include instructions that, when executed by the one or more processing elements, cause the one or more processing elements to determine current availability of communications channels provided by the particular beam for serving the terminal based on the processed resource usage information for the particular beam indicative of the current availability of communications channels provided by the particular beam for serving the terminal; and the instructions that, when executed by the one or more processing elements, cause the one or more processing elements to define one or more parameters for the communications session for the terminal include instructions that, when executed by the one or more processing elements, cause the one or more processing elements to define one or more parameters for the communications session for the terminal based on the determined availability of communications channels provided by the particular beam for serving the terminal.

14. The terrestrial control center of claim 9, wherein:

the instructions that, when executed by the one or more processing elements, cause the one or more processing elements to execute a set up process for establishing a communications session over the satellite communications network between the terminal and endpoint include instructions that, when executed by the one or more processing elements, cause the one or more processing elements to execute a set up process for establishing a type of communications session having a defined, standard bandwidth; and the instructions that, when executed by the one or more processing elements, cause the one or more processing elements to define one or more parameters for the communications session for the terminal include instructions that, when executed by the one or more processing elements, cause the one or more processing elements to define a bandwidth for the communications session that is less than the defined, standard bandwidth for the type of communications session.

15. The terrestrial control center of claim 9, wherein:

the instructions that, when executed by the one or more processing elements, cause the one or more processing elements to determine current availability of resources at the satellite for serving the terminal include instructions that, when executed by the one or more processing elements, cause the one or more processing elements to determine that the satellite does not currently have resources available for serving the communications session;

the instructions that, when executed by the one or more processing elements, cause the one or more processing elements to define one or more parameters for the communications session for the terminal include instructions that, when executed by the one or more processing elements, cause the one or more processing elements to identify an alternative satellite from among the multiple satellites for serving the communications session based on having determined that the satellite does not currently have resources available for serving the communications session;

the instructions that, when executed by the one or more processing elements, cause the one or more processing elements to transmit the one or more parameters defined for the communications session from the terrestrial control center to the satellite include instructions that, when executed by the one or more processing elements, cause the one or more processing elements to transmit, from the terrestrial control center to the satellite, a message for relaying to the terminal that identifies the alternative satellite as available for serving the communications session; and the instructions that, when executed by the one or more processing elements, cause the one or more processing elements to establish the communications session over the satellite communications network between the terminal and the endpoint according to the one or more parameters defined for the communications session include instructions that, when executed by the one or more processing elements, cause the one or more processing elements to establish the communications session over the satellite communications network via the alternative satellite instead of the satellite.

16. The terrestrial control center of claim 9 wherein:

the non-transitory computer-readable storage media further stores instructions that, when executed by the one or more processing elements, cause the one or more processing elements to:

decide, based on the determined current availability of resources at the satellite for serving the terminal, to reduce bandwidth previously allocated for one or more different communications sessions involving one or more different terminals served by the satellite, and reduce the bandwidth allocated for the one or more different communications sessions;

the instructions that, when executed by the one or more processing elements, cause the one or more processing elements to execute a set up process for establishing a communications session over the satellite communications network between the terminal and endpoint include instructions that, when executed by the one or more processing elements, cause the one or more processing elements to execute a set up process for establishing a type of communications session having a defined, standard bandwidth; and the instructions that, when executed by the one or more processing elements, cause the one or more processing elements to define one or more parameters for the communications session for the terminal include instructions that, when executed by the one or more processing elements, cause the one or more processing elements to define a bandwidth for the communications session of at least the defined, standard bandwidth for the type of communications session.

17. A non-transitory, computer-readable storage medium storing instructions for managing communications sessions in a satellite communications network that, when executed by one or more processing elements, cause the one or more processing elements to:

execute, at a terrestrial control center for the satellite communications network, a set up process for establishing a communications session over the satellite communications network between a terminal being served by a satellite of the satellite communications network and an endpoint;

in connection with the set up process, process resource usage information received at the terrestrial control center and from the satellite serving the terminal for which the communications session is being attempted to be established that is indicative of current availability of resources at the satellite;

determine, based on the resource usage information received from the satellite and information regarding the terminal being served by the satellite, current availability of resources at the satellite for serving the terminal;

define, based on the determined current availability of resources at the satellite for serving the terminal, one or more modifications to other communication sessions being served by the satellite, and one or more parameters for the communications session for the terminal;

transmit, to the satellite, the one or more modifications and the one or more parameters defined for the communications session; and establish the communications session over the satellite communications network between the terminal and the endpoint according to the one or more parameters defined for the communications session.

18. The non-transitory, computer-readable storage medium of claim 17, wherein:

the satellite is configured to provide multiple beams for serving terminals;

the instructions that, when executed by the one or more processing elements, cause the one or more processing elements to process the resource usage information received from the satellite that is indicative of the current availability of resources at the satellite include instructions that, when executed by the one or more processing elements, cause the one or more processing elements to process resource usage information received from the satellite that is indicative of the current availability of resources related to a particular beam serving the terminal;

the instructions that, when executed by the one or more processing elements, cause the one or more processing elements to determine current availability of resources at the satellite for serving the terminal include instructions that, when executed by the one or more processing elements, cause the one or more processing elements to determine current availability of resources related to the particular beam for serving the terminal based on the received usage information indicative of the current availability of resources related to the particular beam; and the instructions that, when executed by the one or more processing elements, cause the one or more processing elements to define one or more parameters for the communications session for the terminal include instructions that, when executed by the one or more processing elements, cause the one or more processing elements to define one or more parameters for the communications session for the terminal based on the determined current availability of resources related to the particular beam for serving the terminal.

19. The non-transitory, computer-readable storage medium of claim 17, wherein:

the instructions that, when executed by the one or more processing elements, cause the one or more processing elements to process resource usage information received from the satellite that is indicative of current availability of resources at the satellite include instructions that, when executed by the one or more processing elements, cause the one or more processing elements to process resource usage information received from the satellite that is indicative of the current availability of communications channels provided by the satellite for serving the terminal;

the instructions that, when executed by the one or more processing elements, cause the one or more processing elements to determine current availability of resources at the satellite for serving the terminal include instructions that, when executed by the one or more processing elements, cause the one or more processing elements to determine current availability of communications channels provided by the satellite for serving the terminal based on the received resource usage information for the satellite indicative of the current availability of communications channels provided by the satellite for serving the terminal; and the instructions that, when executed by the one or more processing elements, cause the one or more processing elements to define one or more parameters for the communications session for the terminal include instructions that, when executed by the one or more processing elements, cause the one or more processing elements to define one or more parameters for the communications session for the terminal based on the determined availability of communications channels provided by the satellite for serving the terminal.

20. The non-transitory, computer-readable storage medium of claim 17, wherein:

the instructions that, when executed by the one or more processing elements, cause the one or more processing elements to execute a set up process for establishing a communications session over the satellite communications network between the terminal and endpoint include instructions that, when executed by the one or more processing elements, cause the one or more processing elements to execute a set up process for establishing a type of communications session having a defined, standard bandwidth; and the instructions that, when executed by the one or more processing elements, cause the one or more processing elements to define one or more parameters for the communications session for the terminal include instructions that, when executed by the one or more processing elements, cause the one or more processing elements to define a bandwidth for the communications session that is less than the defined, standard bandwidth for the type of communications session.

* * * * *